United States Patent
Matsuo et al.

(10) Patent No.: US 9,789,642 B2
(45) Date of Patent: Oct. 17, 2017

(54) BOTTLE CONTAINER OF A PINCH-GRIP TYPE, AND MOVABLE INSERTS OF A BLOW MOLD USED TO MOLD SUCH A BOTTLE CONTAINER

(71) Applicants: Yoshinori Matsuo, Tokyo (JP); Teturou Usami, Matsudo (JP); Daisuke Uesugi, Matsudo (JP)

(72) Inventors: Yoshinori Matsuo, Tokyo (JP); Teturou Usami, Matsudo (JP); Daisuke Uesugi, Matsudo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 14/369,431

(22) PCT Filed: Dec. 10, 2012

(86) PCT No.: PCT/JP2012/081942
§ 371 (c)(1),
(2) Date: Jun. 27, 2014

(87) PCT Pub. No.: WO2013/099573
PCT Pub. Date: Jul. 4, 2013

(65) Prior Publication Data
US 2014/0374427 A1 Dec. 25, 2014

(30) Foreign Application Priority Data

Dec. 27, 2011 (JP) ................................. 2011-285829
Dec. 27, 2011 (JP) ................................. 2011-285952

(51) Int. Cl.
*B65D 23/10* (2006.01)
*B65D 25/10* (2006.01)
(Continued)

(52) U.S. Cl.
CPC .......... *B29C 49/4815* (2013.01); *B29C 49/48* (2013.01); *B29C 49/4802* (2013.01);
(Continued)

(58) Field of Classification Search
CPC .............. B65D 23/102; B65D 25/2897; B29K 2995/0074; B29C 49/4815; B29C 49/4802; B29C 2049/4807
(Continued)

(56) References Cited

U.S. PATENT DOCUMENTS

| 4,155,474 A | 5/1979 | Bizzarri |
| 5,199,587 A * | 4/1993 | Ota .................... B29C 33/005 215/381 |

(Continued)

FOREIGN PATENT DOCUMENTS

| JP | U-62-137207 | 8/1987 |
| JP | U-4-21540 | 2/1992 |

(Continued)

OTHER PUBLICATIONS

Mar. 19, 2013 International Search Report issued in International Application No. PCT/JP2012/081942.
(Continued)

*Primary Examiner* — Andrew T Kirsch
(74) *Attorney, Agent, or Firm* — Oliff PLC

(57) ABSTRACT

An invention including a bottle container of a pinch-grip type of synthetic resin blow-molded product and which includes a body of a bottle container, and a grip including a pair of right and left deep-recessed grip portions, formed by concaving both side wall portions of the body of the bottle container, a rear wall portion of the body disposed at a position rearward from the deep-recessed grip portions in a front-back direction, wherein each grip portion includes a caved in recessed wall, vertical side walls positioned facing (Continued)

each other across the wall, and lateral walls disposed at upper and lower ends of the wall, so that surrounding walls as a whole is formed by vertical walls and lateral walls that surround the recessed wall, and wherein the vertical side walls have an angle of gradient which is set at a right angle relative to a transverse center line extending horizontally.

5 Claims, 13 Drawing Sheets

(51) Int. Cl.
  *B65D 53/00* (2006.01)
  *B65D 81/24* (2006.01)
  *B65D 25/28* (2006.01)
  *B29C 49/48* (2006.01)
  *B65D 1/02* (2006.01)
  *B65D 1/44* (2006.01)
  *B29L 31/00* (2006.01)
  *B29L 31/46* (2006.01)
  *B29C 47/06* (2006.01)

(52) U.S. Cl.
  CPC ......... *B65D 1/0223* (2013.01); *B65D 1/0246* (2013.01); *B65D 1/44* (2013.01); *B65D 23/102* (2013.01); *B65D 25/2897* (2013.01); *B29C 47/06* (2013.01); *B29C 2049/4807* (2013.01); *B29C 2049/4892* (2013.01); *B29K 2995/0074* (2013.01); *B29L 2031/463* (2013.01); *B29L 2031/7158* (2013.01)

(58) Field of Classification Search
  USPC .................... 215/396, 398; 220/752, 755
  See application file for complete search history.

(56) References Cited

U.S. PATENT DOCUMENTS

| | | | | |
|---|---|---|---|---|
| 5,215,203 A | * | 6/1993 | Malcolm | B65D 23/102 215/11.1 |
| 5,579,937 A | * | 12/1996 | Valyi | B29C 49/0078 215/384 |
| 6,964,347 B2 | * | 11/2005 | Miura | B29C 49/54 215/383 |
| 8,017,065 B2 | * | 9/2011 | Trude | B29C 49/4802 215/384 |
| 8,080,295 B2 | * | 12/2011 | Kitzmiller | B29C 49/0073 220/62.22 |
| 8,162,655 B2 | * | 4/2012 | Trude | B29C 49/4802 425/522 |
| 8,286,815 B2 | * | 10/2012 | Thierjung | B65D 1/0223 215/384 |
| 8,313,005 B2 | * | 11/2012 | Scarola | B65D 23/102 215/382 |
| D703,541 S | * | 4/2014 | Yourist | B65D 23/102 D9/541 |
| 8,747,727 B2 | * | 6/2014 | Trude | B29C 49/4802 215/384 |
| D722,885 S | * | 2/2015 | Mooney | B65D 23/102 D9/543 |
| 2003/0075521 A1 | * | 4/2003 | Miura | B29C 49/54 215/384 |
| 2004/0155008 A1 | * | 8/2004 | Lane | B65D 79/005 215/381 |
| 2005/0040133 A1 | * | 2/2005 | Saito | B65D 23/102 215/384 |
| 2005/0121409 A1 | * | 6/2005 | Penny | B65D 1/0223 215/384 |
| 2005/0230877 A1 | | 10/2005 | Readdy et al. | |
| 2006/0180568 A1 | * | 8/2006 | Lane | B65D 79/02 215/384 |
| 2006/0249477 A1 | * | 11/2006 | Simpson, Jr. | B65D 1/0223 215/384 |
| 2008/0041864 A1 | * | 2/2008 | Wong | B65D 81/3865 220/738 |
| 2008/0277374 A1 | | 11/2008 | Miura | |
| 2009/0159557 A1 | * | 6/2009 | De Vel | B65D 1/0223 215/384 |
| 2011/0198310 A1 | * | 8/2011 | Deitelbaum | B65D 23/0885 215/12.1 |
| 2012/0267381 A1 | * | 10/2012 | Trude | B65D 23/102 220/675 |
| 2013/0043263 A1 | * | 2/2013 | Yang | B65D 25/2897 220/738 |
| 2014/0061209 A1 | * | 3/2014 | Babinsky | B65D 81/3869 220/592.17 |
| 2014/0374427 A1 | * | 12/2014 | Matsuo | B29C 49/48 220/755 |
| 2015/0017289 A1 | * | 1/2015 | Greenberg | B65D 43/0231 426/115 |

FOREIGN PATENT DOCUMENTS

| | | |
|---|---|---|
| JP | A-06-056138 | 3/1994 |
| JP | A-2003-103612 | 4/2003 |
| JP | A-2004-276602 | 10/2004 |
| JP | A-2006-008190 | 1/2006 |
| JP | A-2006-321568 | 11/2006 |
| JP | A-2007-145378 | 6/2007 |
| JP | A-2007-153366 | 6/2007 |
| JP | A-2009-292510 | 12/2009 |
| WO | WO 2007/069477 A1 | 6/2007 |

OTHER PUBLICATIONS

Mar. 19, 2013 Written Opinion issued in International Application No. PCT/JP2012/081942 (with translation).
Jan. 17, 2017 Office Action issued in U.S. Appl. No. 14/853,421.

\* cited by examiner

BOTTLE CONTAINER OF A PINCH-GRIP TYPE, AND MOVABLE INSERTS OF A BLOW MOLD USED TO MOLD SUCH A BOTTLE CONTAINER

TECHNICAL FIELD

This invention relates to a large-size synthetic resin bottle container with a grip, and especially to a bottle container of a pinch-grip type having the grip integrally formed by caving in both side wall portions of a body toward each other to mold deep-recessed grip portions located in a back-to-back manner, and to movable inserts used together with a blow mold.

BACKGROUND ART

As conventional technologies regarding large-size synthetic resin bottle containers with a grip, there are those described in patent documents D1 and D2. The document D1 describes a grip bottle 1 having an integrally formed grip. This bottle comprises two recessed grip portions 8, which are disposed on both sides of a body, and in which the user is able to put the thumb and fingers of a hand, and the grip 9 disposed between these two recessed grip portions 8.

This grip bottle 1 has a configuration that affords the user to carry the bottle by putting the thumb in one recessed portion 8 formed in a body 3 and the fingers in the other recessed grip portion 8 and pinching the two recessed grip portions 8.

According to the invention described in the document D1, a most recessed wall 82 of each recessed grip portion 8 is designed to have a shape in which the most recessed wall 82 would widen toward outside in a lower portion thereof. Because of this shape, the recessed grip portions 8 can be blow molded without utilizing any movable inserts.

The patent document D2 describes an invention on a handy bottle 1 with an integrally molded grip comprising two recessed grip portions 6, which are disposed on both sides of a body 3, and in which the user is able to put the thumb and fingers of a hand, and a rear wall portion disposed between these two recessed grip portions 6.

This handy bottle 1 has a configuration that affords the user to carry the bottle by putting the thumb in one recessed portion 6 formed in a body 3 and the fingers in the other recessed portion 6 and pinching the two recessed grip portions 6.

The invention described in the document D2 discloses a technology for molding recessed grip portions 6, which comprises utilizing movable inserts 22 having flat and smooth mold surfaces when the handy bottle 1 is molded in a blow mold 21. The movable inserts 22 are previously kept on standby inside the blow mold 21 at positions ranging from a central axis of a preform 20 to 2.0 to 2.6 times as much as the diameter of the preform 20. These movable inserts 22 are moved to most recessed walls 7 inside the recessed grip portions 6 at a certain time point during the blow molding operation. This movement of the movable inserts 22 is said to overcome a tendency of the recessed grip portions 6 in which the most recessed walls 7 of these recessed grip portions 6 get thick but both side walls thereof get thin.

PRIOR ART DOCUMENTS

Patent Documents

Patent document D1: JP2008-8190 A
Patent document D2: JP2003-103612 A

SUMMARY OF THE INVENTION

Technical Problems to be Solved by the Invention

However, the bottle of the invention described in the patent document D1 has largely expanded vertical side walls 84a, 84b of the recessed grip portions 8 to give the grip 9 a favorable shape-holding property. Because of this expansion, a problem arises in that the vertical side walls 84b tend to be slippery to the finger touch, since a line K extending along the vertical side walls 84b is formed at a certain angle of gradient (about 50 degrees as measured from FIG. 3) relative to the horizontal axis passing through the central axis O of the bottle 1 (corresponding to a line Q in FIG. 8 of the document D1).

If the user continues to take hold of the grip with strong grip force even after the content fluid has been largely poured with the rest running low, then the body 3 including the recessed grip portions 8 may easily deform, and there may be a decrease in the easiness to take hold of the grip.

Another problem is that the recessed grip portions 8 are not so deep as to increase the easiness to take hold of the grip because these recessed grip portions 8 are formed without using the movable inserts, and as such the recessed grip portions 8 cannot have a sufficient depth.

On the other hand, in the prior art technology described in the patent document D2, the movable inserts have flat and smooth molding surfaces, and as a result, the recessed grip portions thus molded would have also flat and smooth surfaces. These smooth surfaces cause a problem in that when the thumb and fingers are put in the recessed grip portions, the surfaces of the recessed grip portions tend to be slippery and to result in an unstable grip state.

Portions of preform that are molded into recessed grip portions by being pressed by the movable inserts, especially the portions molded into the most recessed walls, are in a state where stretching deformation comes to a stop due to contact with the movable inserts which are a part of the blow mold. The cease of stretching in these portions gives thickness to the most recessed walls of the recessed grip portions while both side walls of the recessed grip portions get thin. The invention of the document D2 fails to overcome this problem.

This invention is aimed at solving the problems found in the above-described prior art. Therefore, it is a subject of this invention to improve easiness to take hold of the grip by making it easy for the thumb and fingers to get hooked in deep-recessed grip portions and thereby to create a bottle container of a pinch-grip type having deep-recessed grip portions that enable the users to take hold of the bottles in a steadier manner than before.

This invention has thus been made to solve the above-described problems found in prior art. A technical problem of this invention is to eliminate those surfaces of the recessed grip portions that are slippery to the finger touch. An object of this invention is to stabilize the gripping state for the grip formed by the deep-recessed grip portions.

Another technical problem of this invention is to minimize the extent of stretching deformation for the portions of preform that come in contact with the movable inserts.

Another object of this invention is to reduce the thickness of the most recessed walls of the deep-recessed grip portions and to increase the thickness of the side walls thereof disposed on both sides of each of the most recessed walls.

Means of Solving the Technical Problems

Among the means of solving the above-described problems, a first principal means or main feature of the bottle container is a bottle container of a pinch-grip type, which is a synthetic resin blow-molded product and which comprises a body and a grip, which comprises a pair of right and left deep-recessed grip portions formed by concaving both side walls of a body of the bottle container and a rear wall portion of the body disposed at a position rearward from the deep-recessed grip portions in a front-back direction, wherein each of the deep-recessed grip portions comprises a most recessed wall which is deeply caved in, vertical side walls disposed in positions facing each other across the most recessed wall, and lateral walls disposed at upper and lower ends of the most recessed wall, so that a surrounding wall as a whole is formed by these vertical and lateral walls that border and surround the most recessed wall, and wherein the vertical side walls have an angle of gradient which is set at an approximately right angle relative to a transverse center line extending horizontally and passing through a central axis of the bottle container.

The inventors of the present application observed what postures the users would take in holding the grip when they pour out a content fluid from a relatively large-size bottle container of a pinch-grip type having a capacity of 1 liter or more. The inventors have discovered that the angle of gradient of the vertical walls relative to the transverse center line created differences in the extent of stability to which the thumb and fingers are hooked on the vertical walls that constitute the deep-recessed grip portions when the user puts a hand therein and that if the user gets hold of the grip too hard, then the side wall portions of the body tend to deform. These observations have led the inventors to create the above-described means or feature of this invention.

The angle of gradient of the vertical walls of the deep-recessed grip portions formed by caving in the side wall portions of the body toward each other, and more particularly, the angle of gradient of the vertical walls relative to the transverse center line extending horizontally and passing through the central axis of the bottle container, is formed at an approximately right angle. By adopting such a means, it is possible to improve a finger-stop function, i.e., the extent to which the thumb and fingers are hooked on the vertical walls that constitute the deep-recessed grip portions. In addition, since the deep-recessed grip portions having approximately right-angled vertical walls serve as concave ribs, improved rigidity can be achieved for the side wall portions of the body including the deep-recessed grip portions.

Another means or feature of the bottle container of this invention is that, in addition to the first main feature of the bottle container, a narrowest portion disposed between both of the two most recessed walls of the deep-recessed grip portions has a width more than 0 mm and not greater than an outer diameter of a neck base, as seen in a plane cross-sectional view of this portion.

According to the above-described means or feature, a deep and firm grip is achieved by increasing the extent to which the thumb and fingers are placed in the deep-recessed grip portions.

Still another means or feature of the bottle container of this invention is that, in addition to the main feature thereof, a rear wall portion has a semi-circular shape in its plane cross-sectional view.

The above-described means or feature allows the shape of the rear wall portion to come close to the shape of the palm of a hand assumed when the hand holds the grip.

Still another means or feature of the bottle container of this invention is that, in addition to the main feature thereof, at least each of the most recessed walls has a roughened concave wall surface where there are many small dents.

According to the above-described means or feature, the deep-recessed grip portions including the most recessed walls have roughened concave wall surfaces having many small dents. Thus, these roughened concave wall surfaces increase the frictional resistance of the portions which the thumb and fingers come in touch with, control any finger slip, and keep steady gripping force on the grip.

Still another means or feature of the bottle container of this invention is that, in addition to the first main feature thereof, the roughened concave wall surfaces are formed in all areas of the most recessed walls and all areas of the surrounding wall that border and surrounds each of the most recessed walls.

According to the above-described means or feature, slip is controlled between the thumb/fingers and the roughened concave wall surfaces, and stable pressing contact is achieved, no matter what posture the bottle container would take when the user puts the thumb and fingers in the deep-recessed grip portions to take hold of the grip.

Among the means of this invention to solve the above-described problems, a second main feature of the bottle container of this invention is a bottle container of a pinch-grip type, which is a synthetic resin blow molded product and which has a grip comprising a pair of right and left deep-recessed grip portions disposed back to back and formed by concaving both side wall portions of the body of the bottle container toward each other and a rear wall portion of the body disposed at a position rearward from the deep-recessed grip portions in a front-back direction, wherein concave surfaces including at least the most recessed walls of the deep-recessed grip portions have roughened concave wall surfaces where there are many small dents.

The concave wall surfaces including the most recessed walls of the deep-recessed grip portions are where the thumb and fingers come in contact with the deep-recessed grip portions. Because the concave wall surfaces are roughened with many small dents, these surfaces are not slippery. The thumb and fingers put in the deep-recessed grip portions give steady grip force on the grip with no finger slip.

Another feature of the bottle container of this invention is that, in addition to the second main feature thereof, the roughened concave wall surfaces are formed over entire areas of the most recessed walls and the surrounding walls that border and surround these most recessed walls.

Since the roughened concave wall surfaces are formed over entire areas of the most recessed walls and the surrounding walls that border and surround the most recessed walls, the stable pressure contact of the thumb/fingers with the roughened concave wall surfaces is achieved with no finger slip, no matter what posture the bottle container is allowed to assume when the user puts the thumb and fingers in the recessed grip portions to take hold of the grip.

Among the means of this invention to solve the above-described problems, a main feature of movable inserts disposed in a blow mold for molding the bottle container is that the movable inserts are used to mold the deep-recessed grip portions and are disposed in the blow mold for molding the synthetic resin bottle container of a pinch-grip type, which container comprises a pair of right and left deep-recessed grip portions, which are disposed back to back and are formed by concaving both side wall portions of the body, and a rear wall portion disposed at a position rearward from both deep-recessed grip portions, wherein molding surfaces of the movable inserts are treated to give roughening mold surfaces where there are many small projections.

Since the movable inserts have roughening mold surfaces, these roughening surfaces come in contact with the preform when the movable inserts are made to move forward into the body wall of the preform in its stretching stage to mold the deep-recessed grip portions. The roughening mold surfaces comprise many small projections, and the portions of the preform that are stretched and deformed into the deep-recessed grip portions come to contact with the tips of these small projections almost in a point contact manner. Therefore, those portions of the preform to be molded into the deep-recessed grip portions would be stretched and molded without causing any large frictional resistance on the surfaces with which the movable inserts come in contact.

Another feature of the movable inserts disposed in the blow mold for molding the bottle container of this invention is that, in addition to the main feature of the movable inserts, embossing is used to prepare the roughening mold surfaces.

In the case where embossing is used to roughen the molding surfaces of the movable inserts, it is made easy to mold the roughening mold surfaces having many small projections Still another feature of the movable inserts disposed in the blow mold for molding the bottle container of this invention is that, in addition to the main feature of the movable inserts, the tips of small projections on the roughening mold surfaces are rounded so as to give gently curved surfaces that allow for smooth stretching movement.

If the tips of small projections on the roughening mold surfaces are rounded so as to give gently curved surfaces, then the contact of preform portions with small projections would have a reduced level of resistance, regardless of the shape of small projections.

Effects of the Invention

This invention having the above-described features has the following effects:

In the case of a large-size bottle container with a capacity of 1 liter or more, sometimes the flow of a content fluid has an unsteady flow speed, and the bottle in its inclined posture may sway back and forth unless the inclined posture cannot be firmly maintained. If the deep-recessed grip portions are formed so as to have the vertical wall disposed at an approximately right angle as specified by the first main feature of this invention, then the grip would be easy to hold and less slippery due to a large finger-stop effect. Even the user having relatively small palm of a hand can assuredly pour the content fluid from the bottle In addition, even if the user keeps holding the grip with large grip force after the content fluid has been poured out and there is not much left in the bottle, it is still easy for the user to hold the grip steadily since the side wall portions of the body including the deep-recessed grip portions can be protected against deformation.

According to an exemplary aspect of the invention, a narrowest portion disposed between the two most recessed walls of the deep-recessed grip portions has a width more than 0 mm and not greater than an outer diameter of a neck base. According to this feature, the bottle container of the pinch-grip type is far easier to hold than ever because the grip is slim and easy to hold with a hand.

According to an exemplary aspect of the invention, a rear wall portion has a semi-circular shape in its plane cross-sectional view. According to this feature, the user can fit the palm of a hand to the shape of the rear wall portion when holding the grip with the hand. Thus, the bottle container of the pinch-grip type would become easier to hold.

According to an exemplary aspect of the invention, at least each of the most recessed walls has a roughened concave wall surface where there are many small dents. According to this feature, it becomes possible to get steady hold of the grip and to handle the bottle container smoothly.

According to an exemplary aspect of the invention, the roughened concave wall surfaces are formed in all areas of the most recessed walls and all areas of the surrounding wall that border and surrounds each of the most recessed walls. According to this feature, it becomes possible to control the slide between fingertips and the roughened concave wall surfaces of the deep-recessed grip portions, no matter what posture is assumed by the bottle container held with a hand. Thus, smooth and steady handling of the bottle container can be assured.

According to the second main feature of the bottle container of this invention, grip force can be steadily applied to the grip without any slip of the thumb/fingers that have been put in the deep-recessed grip portions. Thus, smooth handling of the bottle container can be achieved by holding the grip.

According to an exemplary aspect of the invention, the roughened concave wall surfaces are formed over entire areas of the most recessed walls and the surrounding walls that border and surround these most recessed walls. According to this feature, smooth and steady handling of the bottle container can be secured because the stable pressure contact of the thumb/fingers with the roughened concave wall surfaces is achieved with no finger slip, no matter what posture the bottle container is allowed to assume when the user puts the thumb and fingers in the recessed grip portions to take hold of the grip.

According to the main feature of the movable inserts used in this invention, those portions of the preform to be molded into the deep-recessed grip portions would be stretched and molded into the deep-recessed grip portions without causing any large frictional resistance on the surfaces with which the movable inserts come in contact. Thus, those portions of the preform can be fully stretched and deformed into the deep-recessed grip portions in a state in which uneven wall thickness is minimized over the entire areas of these grip portions.

According to an exemplary aspect of the invention, embossing is used to prepare the roughening mold surfaces. According to this feature, the roughening mold surfaces can be easily formed by embossing the molding surfaces by means of many small projections.

According to an exemplary aspect of the invention, the tips of small projections on the roughening mold surfaces are rounded so as to give gently curved surfaces that allow for a smooth drawing movement. According to this feature, the contact of preform portions with the small projections would have a reduced level of resistance, regardless of the shape of those small projections. Therefore, the entire areas of the deep-reduced grip portions can be molded smoothly and reliably by stretching and deforming the corresponding portions of the preform.

BRIEF DESCRIPTIONS OF THE DRAWINGS

MODE OF CARRYING OUT THE INVENTION

Figure 1:
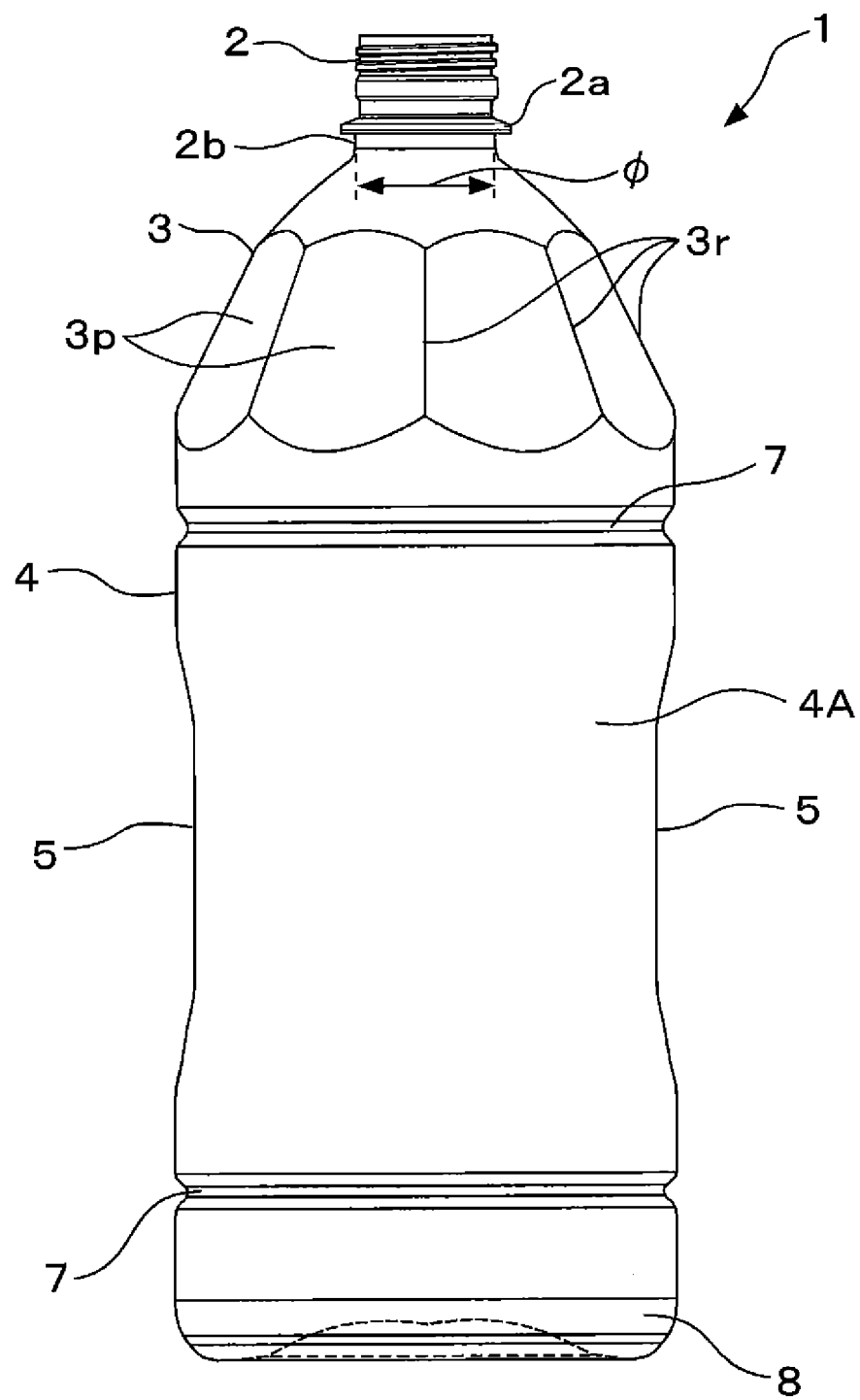
FIG. 1 is a front view of the bottle container of a pinch-grip type in the first embodiment of this invention.
Figure 2:
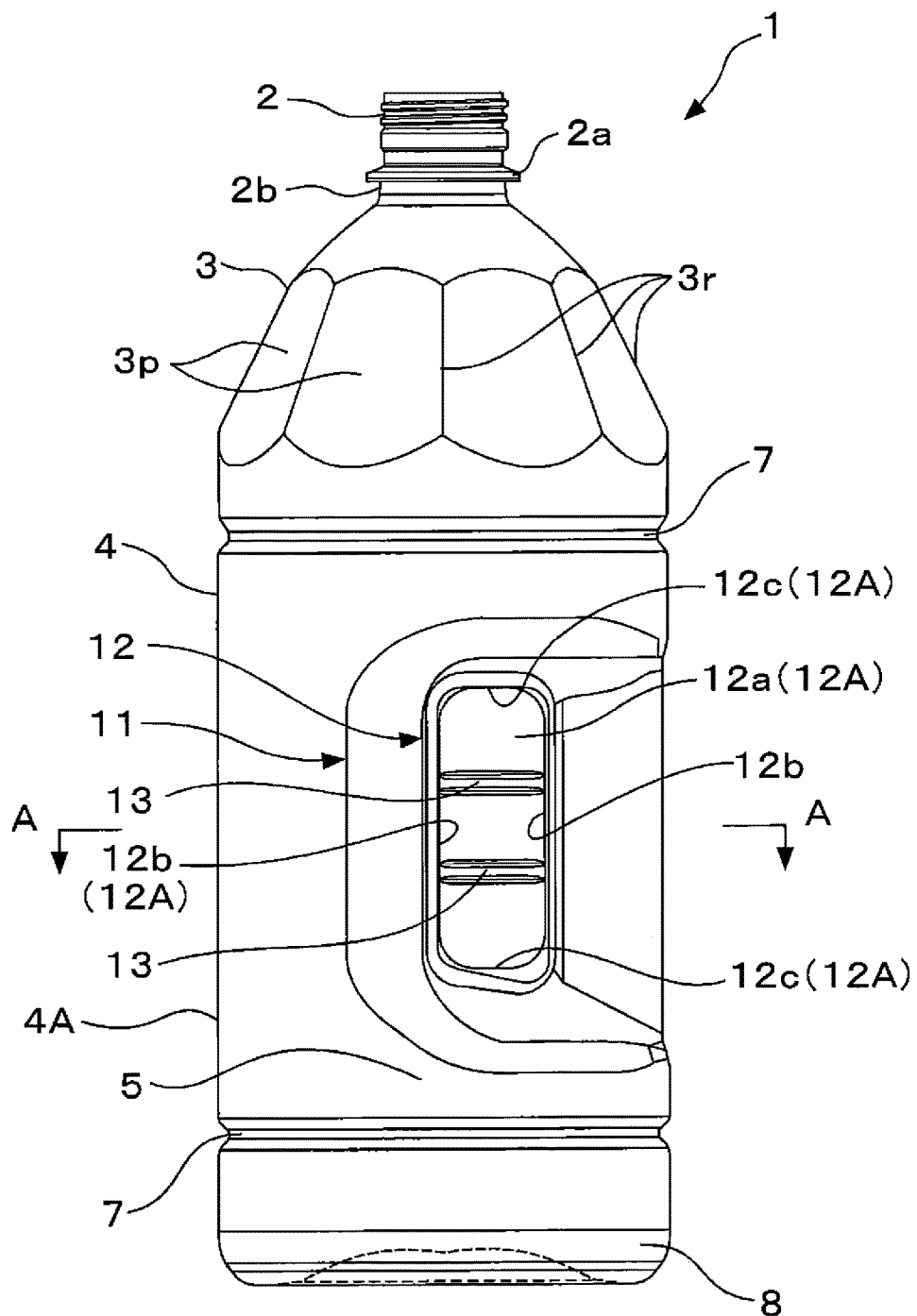
FIG. 2 is a side view of the bottle container of the first embodiment shown in FIG. 1.
Figure 3:
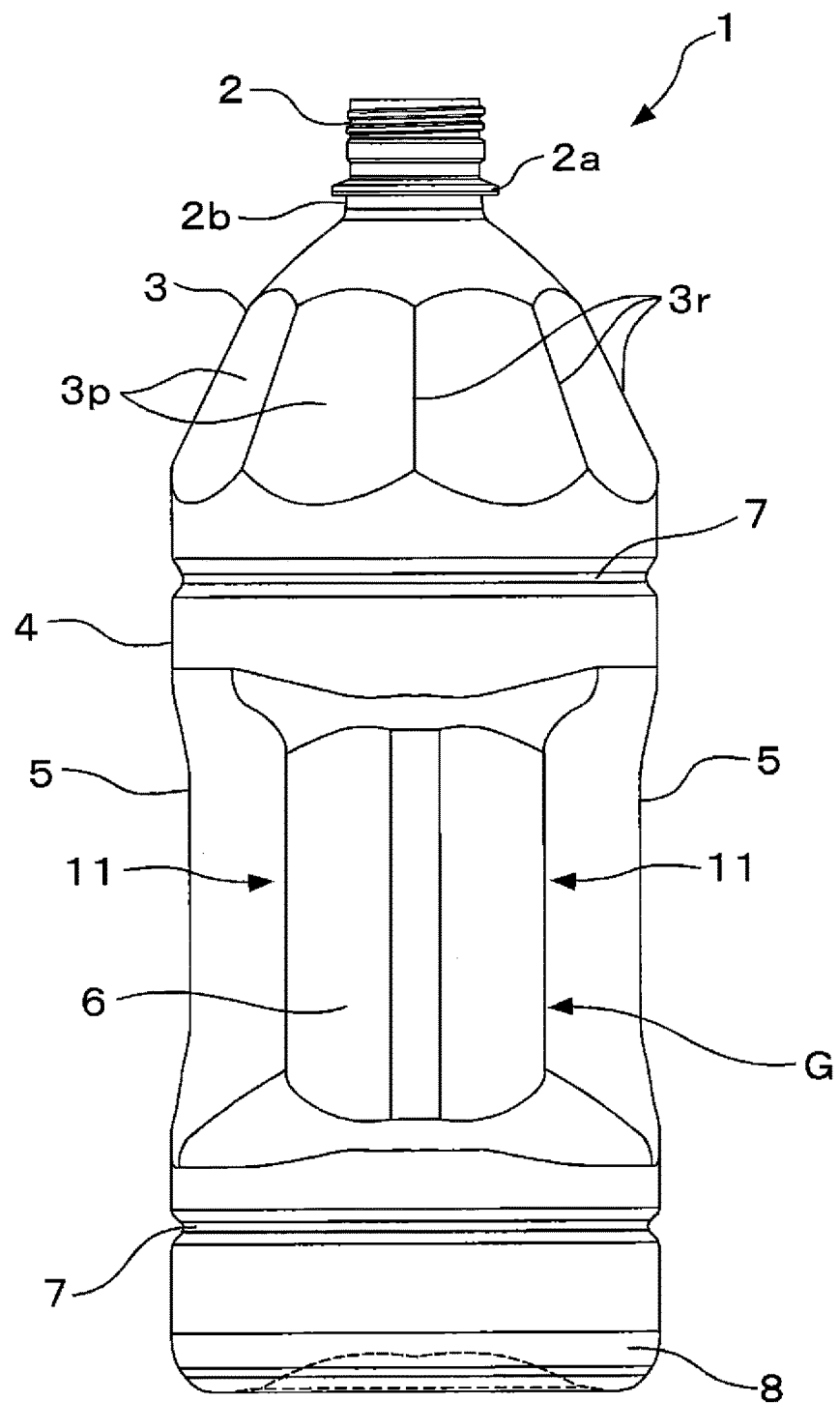
FIG. 3 is a rear view of the bottle container of the first embodiment shown in FIG. 1.

This invention is further described with respect to preferred embodiments, now referring to the drawings. FIGS. 1-4 show the bottle container of a pinch-grip type in the first embodiment of this invention, in which FIG. 1 is a front view; FIG. 2, a side view; FIG. 3, a rear view; and FIG. 4, a plane cross-sectional view taken along line A-A in FIG. 2. In the following description, the front-back direction denotes a direction passing along a transverse center line in FIG. 4. The horizontal direction denotes a direction perpendicular to the transverse center line in FIG. 4. The vertical direction denotes a direction passing through the neck and the bottom along the central axis of the bottle.

This bottle container 1 is a biaxially stretched, blow molded product made of a synthetic resin, and has a total height of 337 mm, a maximum diameter of 126 mm, and a content capacity of 2.7 liters. The bottle container 1 has a bottom 8 at a lower end of a cylindrical body 4, a shoulder 3 at an upper end of the body 4, and a cylindrical neck 2 has a screw thread on an outer peripheral surface. Under this structure, the bottom 8 supports a standing position, and the shoulder 3 has a tapered cylindrical shape, gradually narrowing toward the neck 2. A neck ring 2a is disposed at a lower end of the neck 2.

The shoulder 3 is in a truncated cone shape in its upper portion and is in a truncated polygonal cone shape in its lower portion. The latter shape comprises eight flat panels 3p having the same shape and size which are disposed in parallel in the circumferential direction. Between two panels 3p situated next to each other there is a ridge 3r.

When there is a decrease in the pressure inside the bottle container 1, all the panels 3p sag inward and reach an elastically deformed state, thus performing a vacuum-absorbing function. The ridges 3r serve as vertical reinforcing ribs against action of force applied from outside at the time of decompression or contact with the thumb/fingers of a hand. At those times, the ridges 3r allow individual panels 3p to get deformed into a dented state, and yet work to prevent a distortion of the entire truncated polygonal cone shape that may cause disfigurement of this portion.

Side wall portions 5, 5 are disposed on both sides of the body 4 at positions facing in the opposite direction. Recessions 11, 11 are formed in areas somewhat behind a center of the bottle viewed in a front-back direction. Deep-recessed grip portions 12 are formed nearly in the center of these recessions 11 by further caving in the side wall portions 5.

Peripheral ribs 7, 7 serving as the reinforcing ribs are disposed on the borders between the shoulder 3 and the body 4 and between the body 4 and the bottom 8, respectively. In a front area of the body 4 between the upper peripheral rib 7 and the lower peripheral rib 7, there is a label-attachable area 4A where the surface is smooth (See FIG. 1).

Figure 4:
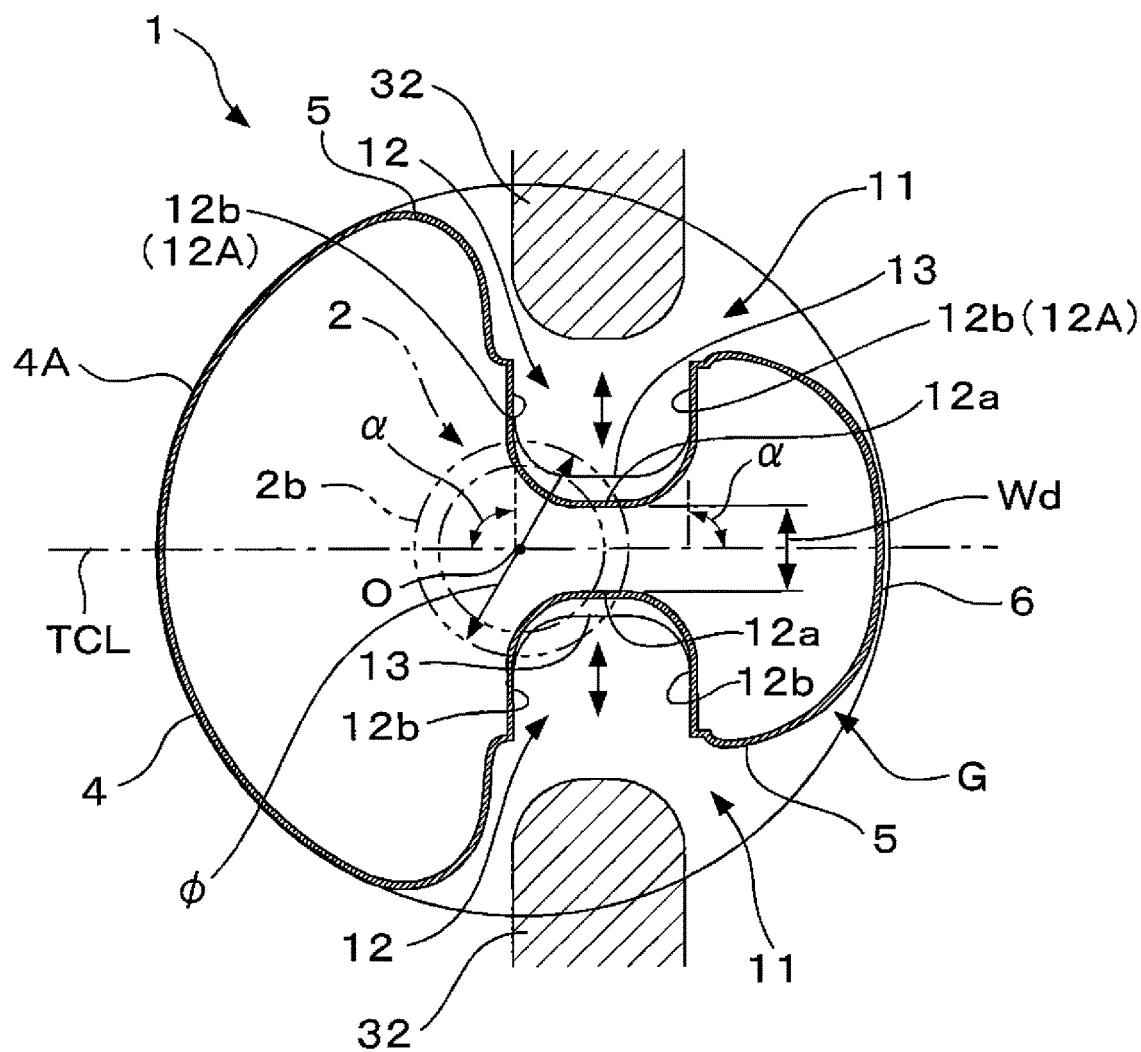
FIG. 4 is a plane cross-sectional view of the bottle container taken along line A-A shown in FIG. 2.

As shown in FIGS. 2 and 4, each of the deep-recessed grip portions 12 comprises a most recessed wall 12a, a pair of vertical walls 12b, 12b, which are disposed on a front side and a back side as viewed in the front-back direction, at positions facing each other across a lateral width of the most recessed wall 12a, and a pair of lateral walls 12c, 12c, which are disposed on an upper side and a lower side as viewed in a vertical direction, at positions facing each other across a vertical length of the most recessed wall 12a.

A transverse center line, TCL, is an imaginary line extending laterally and passing through a central axis O of the bottle container 1, as shown in FIG. 4. The angle of gradient is set at an approximately right angle for the vertical walls 12b, 12b, which are disposed on a front side and a back side of the most recessed wall 12a as viewed in the front-back direction. In other words, both of the vertical walls 12b, 12b have a gradient, α, of an approximately right angle relative to the transverse center line, TCL. By the angle of gradient, α, set at a right angle, it is meant that the angle of gradient, α, is preferably 90 degrees, and is within a range of 85-95 degrees including production errors.

A narrowest portion is disposed between one most recessed wall 12a of a deep-recessed grip portion 12 formed on one sidewall 5 and the other most recessed wall 12a of the corresponding deep-recessed grip portion 12 formed on the other sidewall 5 where both of the most recessed walls 12a are disposed in a back-to-back manner. This narrowest portion has a width, Wd, more than 0 mm and not greater than an outer diameter, φ, of a neck base 2b disposed at a lower end of a neck ring 2a. In the first embodiment of this invention, the neck base 2b has an outer diameter, φ, of 35 mm, and the narrowest portion has a width, Wd, of 16 mm, but these dimensions are not limitative. The outer diameter, φ, of the neck base 2b is a length that is unchanged before and after the preform is biaxially stretched and blow molded. The width, Wd, of the narrowest portion is set by using this unchanged outer diameter, φ, of the neck base 2b as a standard.

In this invention, a grip, G, is an area including the deep-recessed grip portions 12, 12 on the right and left sides of the body 4 and a rear wall portion 6 disposed at a position rearward from these deep-recessed grip portions 12, 12 and formed in a semi-circular shape as seen in a cross-sectional view.

The grip, G, of the bottle container 1 can be made slim in shape and easy to hold, by setting the width, Wd, of the narrowest portion at a size less than the outer diameter, φ, of the neck base 2b. Moreover, a deeper grip can be obtained because the thumb and fingers can be put inside the deep-recessed grip portions 12 to a larger extent. Thus, the bottle container of the pinch-grip type can be made easier to hold than ever.

The deep-recessed grip portions 12, 12, such as described above, are formed at the time when the preform is biaxially stretched and blow molded, and can be formed by adopting process steps of allowing the movable inserts 32, 32 to approach toward each other from a lateral direction, which is perpendicular to the transverse center line, TCL, and then bringing the movable inserts 32, 32 back to their original positions, as shown in FIG. 4.

In the case of the bottle container 1 of this invention, the user puts the thumb in one deep-recessed grip portion 12 and put other fingers in the other deep-recessed grip portion 12 to get hold of the grip G from behind the container 1. At that time, cushions of the thumb and fingers come in contact with vertical walls 12b located on the back side. If a gradient, α, of the vertical walls 12b, 12b is set at an approximately right angle relative to the transverse center line, then any slip is controlled between the cushions of the thumb/fingers and the vertical walls 12b, thus giving the vertical walls 12b a large finger stop effect. Therefore, the grip G can be made difficult to slip and easy to hold. Even those users having small hands can steady the bottle container 1 in pouring the content.

Since both of the deep-recessed grip portions 12 are provided with vertical walls 12b, 12b which are formed at an approximately right angle on both sides viewed from the front-back direction, these deep-recessed grip portions 12 perform as concave ribs against force from outside, such as the grip force, and prevent distortion in the side wall portions, that is, deformation into a dented shape that may spoil the outer appearance of the side wall portions 5 of the body 4 including the deep-recessed grip portions 12.

In addition, each of the deep-recessed grip portions 12 is provided with two reinforcing ribs 13 (see FIG. 2) which are disposed transversally in a shape of an arch (see FIG. 4). These reinforcing ribs 13 perform a function of increasing the mechanical strength of the deep-recessed grip portions 12. The two ribs 13 divide the area of the deep-recessed grip portions 12 vertically into 3 sections, which enable the user to put the thumb and each finger in either section so as to steady the fingertip. The number of the reinforcing ribs 13 disposed in the deep-recessed grip portions should not be construed as limitative to two shown in the above-described first embodiment, but can be set arbitrarily, depending on the size of the bottle container 1 and the shape of the deep-recessed grip portions.

The circumferential length of the grip G is set at a certain value that is adapted to an average size of the palm of the hands. This is because it is necessary for users to be able to get hold of the grip G by putting the thumb in one deep-recessed grip portion 12 and other fingers in the other deep-recessed grip portion 12.

When the user gets hold of the grip G to use this bottle container 1, the palm of his/her hand fits in with the rear wall portion 6 having a semicircular shape. Because of this state, the easiness to hold the grip G can be improved, and the bottle container 1 can be held stably.

Figure 5:
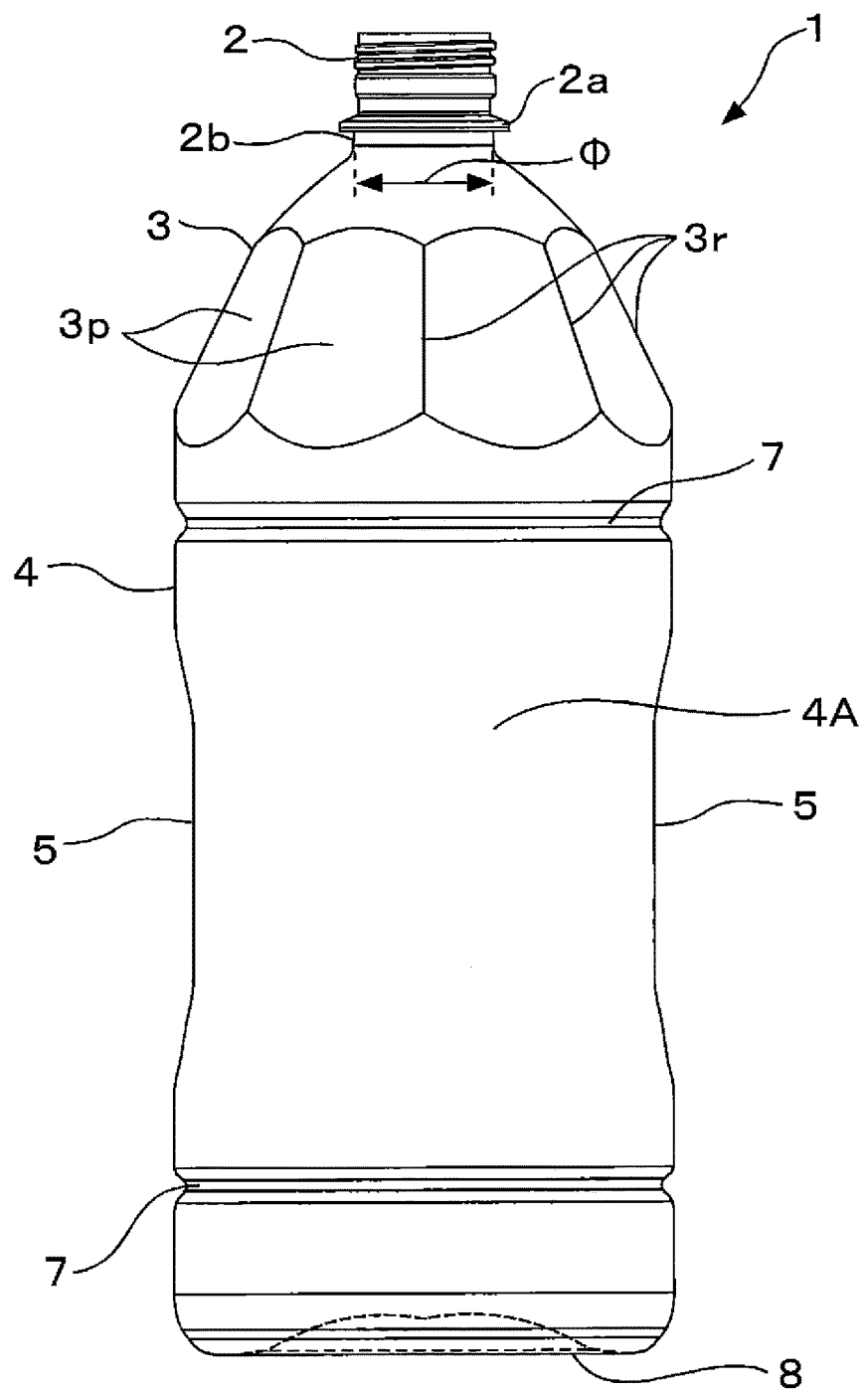
FIG. 5 is a front view of the bottle container in the second embodiment of this invention.
Figure 6:
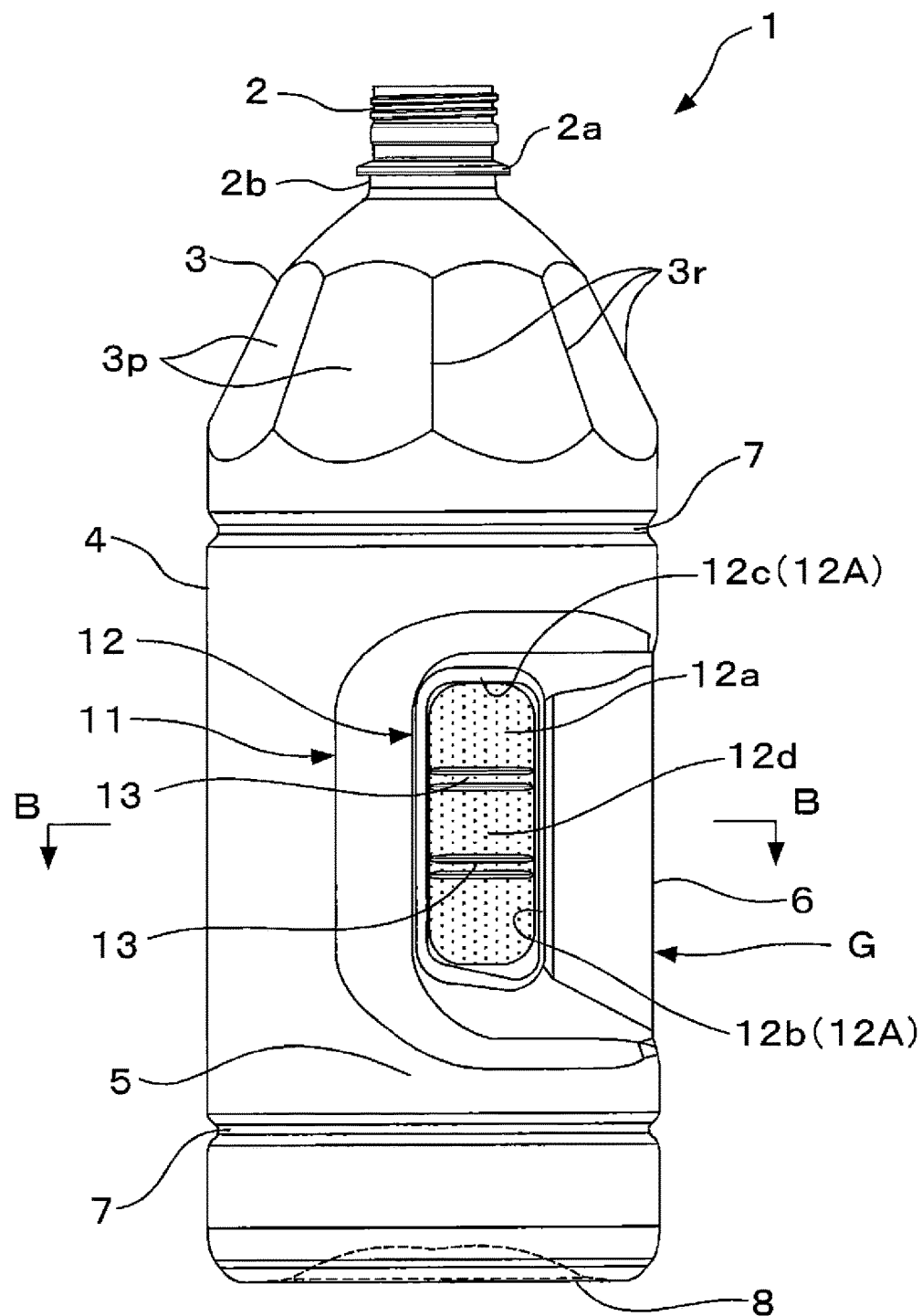
FIG. 6 is a side view of the bottle container of the second embodiment shown in FIG. 5.
Figure 7:
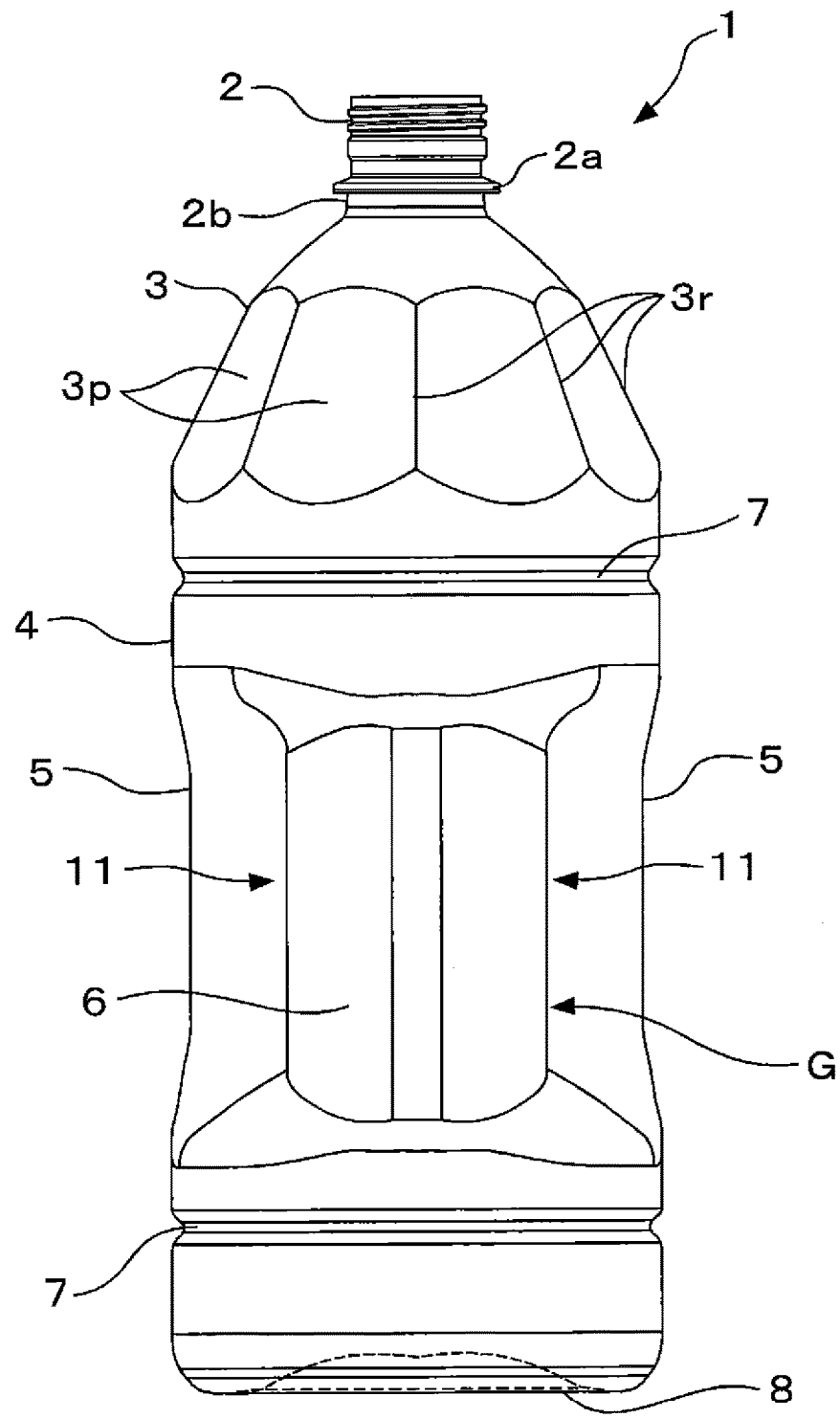
FIG. 7 is a rear view of the bottle container of the second embodiment shown in FIG. 5.
Figure 8:
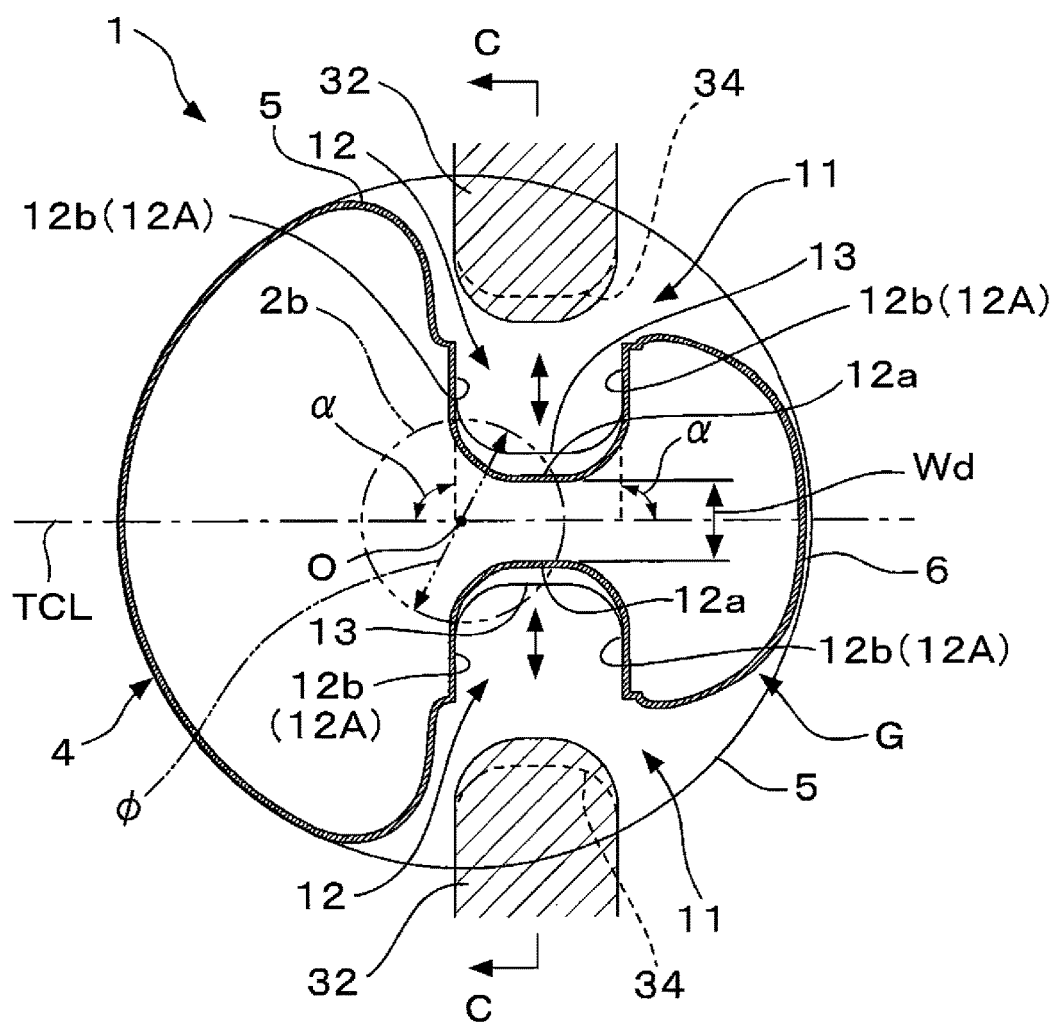
FIG. 8 is a plane cross-sectional view of the bottle container taken along line B-B shown in FIG. 6.
Figure 9:
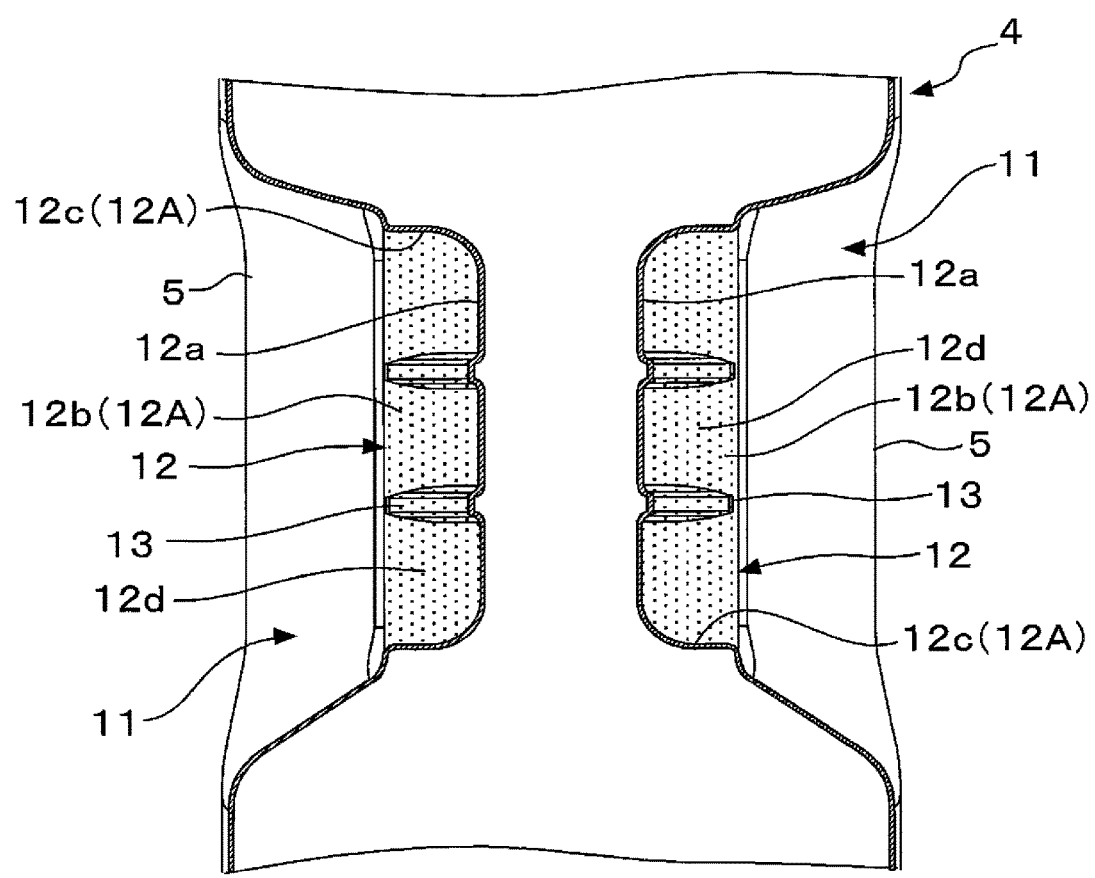
FIG. 9 is a rear vertical sectional view of an important part taken along line C-C shown in FIG. 8.

FIGS. 5-13 show the bottle container of the pinch-grip type in a second embodiment of this invention, in which FIG. 5 is a front view; FIG. 6, a side view; FIG. 7, a rear view; FIG. 8, a plane cross-sectional view taken along line B-B in FIG. 6; FIG. 9, a rear, vertical sectional view of an important part taken along line C-C shown in FIG. 8; and FIG. 10, a partially enlarged vertical section of a roughened concave wall surface of a deep-recessed grip portion. In the description found below, the front-back direction denotes a direction along a transverse center line in FIG. 8. The horizontal direction denotes a direction perpendicular to the transverse center line in FIG. 8. The vertical direction denotes a direction passing through the neck and the bottom along the central axis of the bottle. If the second embodiment has the same portions as the first embodiment, then the same reference signs are used, and the descriptions for these signs will be omitted.

As shown in FIGS. 6 and 9, each of the deep-recessed grip portions 12 comprises a most recessed wall 12a, which is further dented from each recession 11, and surrounding walls 12A that border and surround this most recessed wall 12a and comprise vertical walls 12b and lateral walls 12c. The concave surface of each deep recessed grip portion 12 comprises this most recessed wall 12a and the surrounding walls 12A (i.e., the vertical walls 12b and the lateral walls 12c) and is formed as a roughened concave wall surface 12d having many small dents 12e (See FIG. 10).

As found in FIG. 8, the transverse center line, TCL, is an imaginary line extending in the front-back direction passing through the central axis O of the bottle container 1. The angle of gradient, α, for the surrounding walls 12A, that is, for the vertical walls 12b, 12b relative to the transverse center line, TCL, is set at a roughly right angle. This means that a more preferred angle of gradient, α, is 90 degrees, with production error being in a range of 85 to 95 degrees.

The narrowest portion disposed between the two most recessed walls 12a of the deep-recessed grip portions 12 has a width, Wd, of more than 0 mm and not greater than an outer diameter φ of the neck base 2b disposed under the neck ring 2a. In the second embodiment, too, the neck base 2b has an outer diameter of 35 mm, and the narrowest portion has a Wd of 16 mm, although the diameter and the width are not limitative to these values. The outer diameter of the neck base 2b is a constant dimension with no change before and after the biaxial stretching and blow molding of the preform 20 (See FIG. 11). The width, Wd, of the narrowest portion is determined by using the outer diameter φ of the neck base 2b as the standard.

The grip G comprises the right and left deep-recessed grip portions 12 and a rear wall portion 6 of the body 4 disposed at a position rearward from these deep-recessed grip portions 12, 12 and formed in a semi-circular shape as seen in a plane cross-sectional view.

As described above, the width, Wd, of the narrowest portion is not greater than the outer diameter φ of the neck base 2b. With this size, the grip G can be easy to take hold of. A deep and firm grip is achieved since it has become possible to increase considerably the extent to which the tips of thumb and fingers are put in the deep-recessed grip portions 12. At that time, the cushions of the thumb and fingers put inside the deep-recessed grip portions 12 are pushed against the roughened concave wall surfaces 12d of the deep-recessed grip portions 12 securely in a less slippery state. Therefore, the bottle container of the pinch-grip type of this invention can be steadier and easier to hold than ever.

The deep-recessed grip portions 12, 12, such as described above, are formed at the time when the preform 20 is being biaxially stretched and blow molded, and can be formed by adopting the process steps of allowing the movable inserts 32, 32 to approach toward each other from a lateral direction, which is perpendicular to the transverse center line, TCL, and then bringing the movable inserts 32, 32 back to their original positions, as shown in FIG. 8.

In the case of the bottle container 1 of this invention, the user puts the thumb in one deep-recessed grip portion 12 and put other fingers in the other deep-recessed grip portion 12 to get hold of the grip G from behind the container 1. At that time, cushions of the thumb and fingers come in contact with the vertical walls 12b located on the back side of the surrounding walls 12A. The deep-recessed grip portions 12 in the second embodiment are provided with roughened concave wall surfaces 12d having small dents 12e, and the gradient, α, of the vertical walls 12b, 12b is set at an approximately right angle relative to the transverse center line, as in the first embodiment. Then, any slip is controlled between the cushions of the thumb/fingers and the vertical walls 12b, thus giving the vertical walls 12b a large finger stop effect. Therefore, the grip G can be made difficult to slip and easy to hold. Even those users having small hands can steady the bottle container 1 in pouring the content.

The vertical walls 12b, 12b of the deep-recessed grip portions 12 formed at an approximately right angle perform as concave reinforcing ribs against force acting on the body 4, prevent the body 4 from developing distortion, and control the development of a buckling phenomenon in the deep-recessed grip portions 12.

In addition, each of the deep-recessed grip portions 12 is provided with two reinforcing ribs 13 (see FIGS. 6 and 9) which are disposed transversally in a shape of an arch (see FIG. 8). These reinforcing ribs 13 perform a function of increasing the mechanical strength of the deep-recessed grip portions 12. The two ribs 13 divide the area of the deep-recessed grip portions 12 vertically into three sections, which enable the user to put the thumb and each finger in either section so as to steady each fingertip. The number of the reinforcing ribs 13 disposed in the deep-recessed grip portions 12 should not be construed as limitative to two shown in the above-described first and second embodiments, but can be one or three because this number can be set arbitrarily, depending on the size of the bottle container 1 and the shape of the deep-recessed grip portions. These reinforcing ribs 13 may or may not be provided with small dents.

Figure 11:
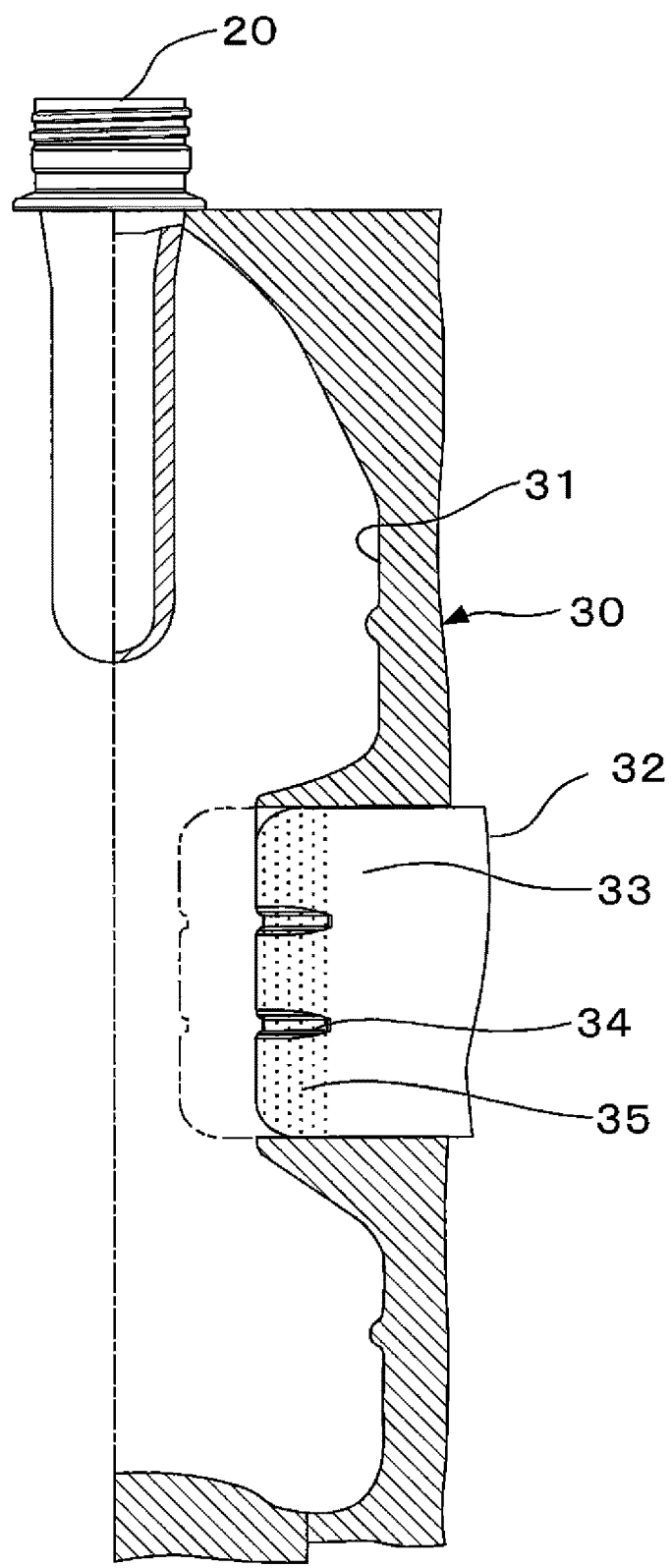
FIG. 11 is a vertical section of a blow mold having a movable insert of this invention.
Figure 12:
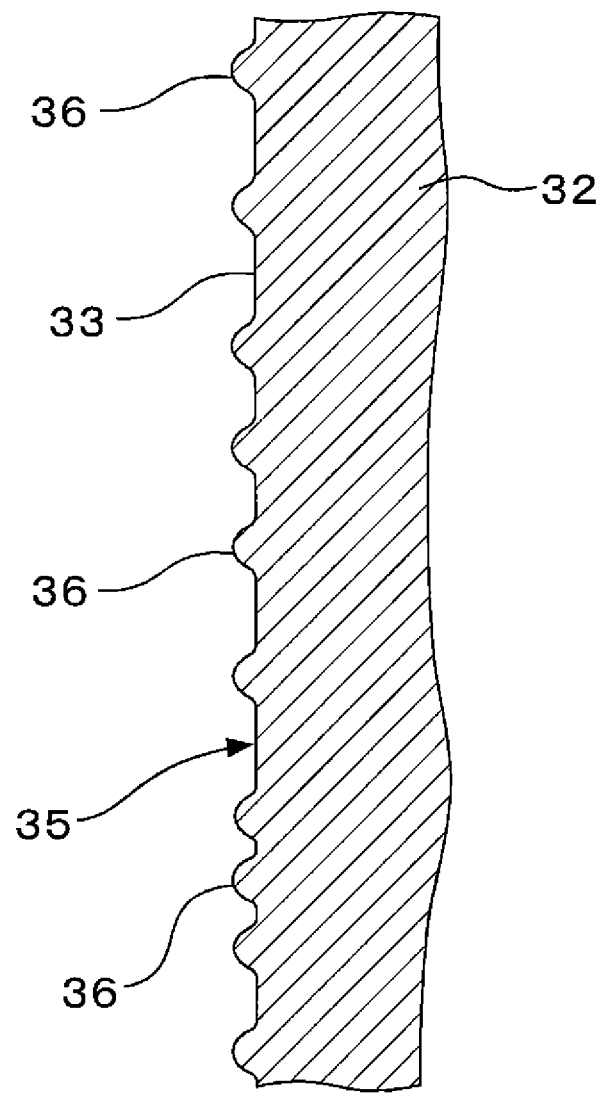
FIG. 12 is an enlarged vertical section of a roughening mold surface of the movable insert shown in FIG. 11.
Figure 13:
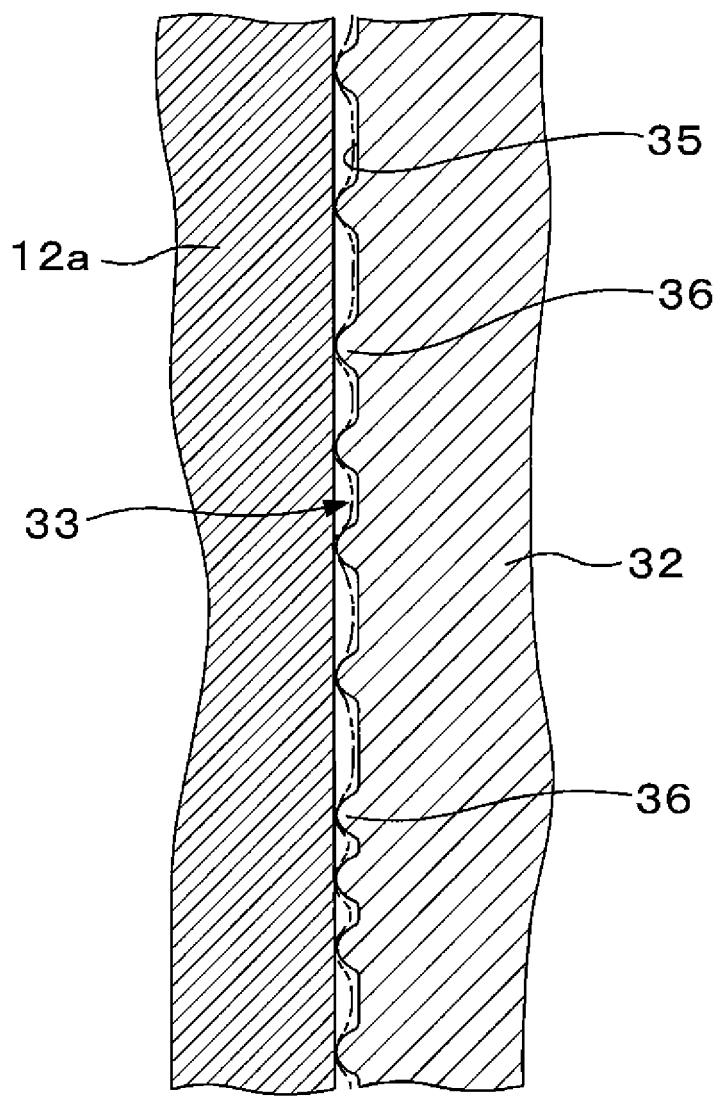
FIG. 13 is an explanatory diagram showing the action of the roughening mold surface of the movable insert.

FIG. 11 is a simplified schematic view, with a half in vertical section, of an embodiment of a biaxial stretching and blow mold for molding a bottle container of a pinch-grip type of this invention, and shows the movable insert right before a stretching operation. The blow mold 30 comprises a pair of split molds and a bottom mold. A pair of movable inserts 32 can move into and draw back from a cavity formed by the blow mold 30, and is disposed in areas of mold surface used for molding recessions 11, which are at roughly middle height positions of the pair of split molds.

The movable inserts 32 are the portions of the mold that are used to mold the deep-recessed grip portions 12 of the bottle container 1. A head portion of each movable insert 32, that is, the portion which is moved forward into the cavity, is in a rounded, gently curved shape. As shown in an enlarged view of FIG. 12, a front surface of this head portion of each movable insert 32 is a roughening mold surface 35 where there are many small projections 36 having an approximately equal projecting height. A reference sign 34 in FIG. 11 is for grooves used to form the reinforcing ribs 13.

The roughening mold surface 35 is molded by embossing the surface of each head portion of the movable inserts 32 by using blast injection, corona discharge, or etching.

Since many small projections 36 are rounded at least at the corners of the head portion, the roughening mold surface of the head portion has a rounded, gently curved surface. When the movable inserts 32 are brought forward to stretch the preform wall that would become the deep-recessed grip portions 12, it is possible to minimize as much as possible the frictional resistance that develops between each small projection 36 and the wall portion to be stretched and molded into the deep-recessed grip portions 12.

The movable inserts 32 allow the portions of a preform 20 that are opposed to the movable inserts 32 to be stretched and deformed into the deep-recessed grip portions 12, by moving forward the movable inserts 32 to a position shown in FIG. 11 by a two-dot chain line at an appropriate point of time during a period in which the preform 20 is stretched and blow molded into a bottle container 1. It goes without saying that the portions of the preform 20 that are opposed to the movable inserts 32 are in a heated, softened state at the time when the portions of the preform 20 opposed to the movable inserts 32 are stretched and deformed into the deep-recessed grip portions 12.

When the movable inserts 32 are moved forward, the portions of the preform 20 that are opposed to the movable inserts 32 (e.g., the portions to be molded into the most recessed walls 12a) are being stretched and deformed. Therefore, molding surfaces 33 of the movable inserts 32 come in contact with the portions of the preform 20 that are being stretched and expanded (See a solid line in FIG. 13). The movable inserts 32 continue to move forward to form the deep-recessed grip portions 12.

Since the portions of the preform 20 to be molded into the deep-recessed grip portions 12 come in contact with the roughening mold surface 35 of the movable inserts 32, the contact of the preform 20 with the tips of each small projection 36 would be point contact. For this reason, contact resistance can be made quite small between the portions of the preform 20 to be molded into the deep-recessed grip portions 12 and the molding surface 33 of the movable inserts 32. Therefore, these portions of the preform 20 are stretched and deformed comfortably into the deep-recessed grip portions 12 as the movable inserts 32 are moved forward.

At the time when the deep-recessed grip portions 12 are molded by moving forward the movable inserts 32, the most recessed walls 12a, that is, the areas of the deep-recessed grip portions 12 facing respective front surfaces of the movable inserts 32, are naturally stretched and deformed with the advancement of the movable inserts 32, and would not become thick locally. On the other hand, this means that the stretching deformation of the most-recessed walls 12a inhibits the development of local stretch of the vertical walls 12b and the lateral walls 12c, thus preventing the entire surrounding walls 12A from thinning.

Figure 10:
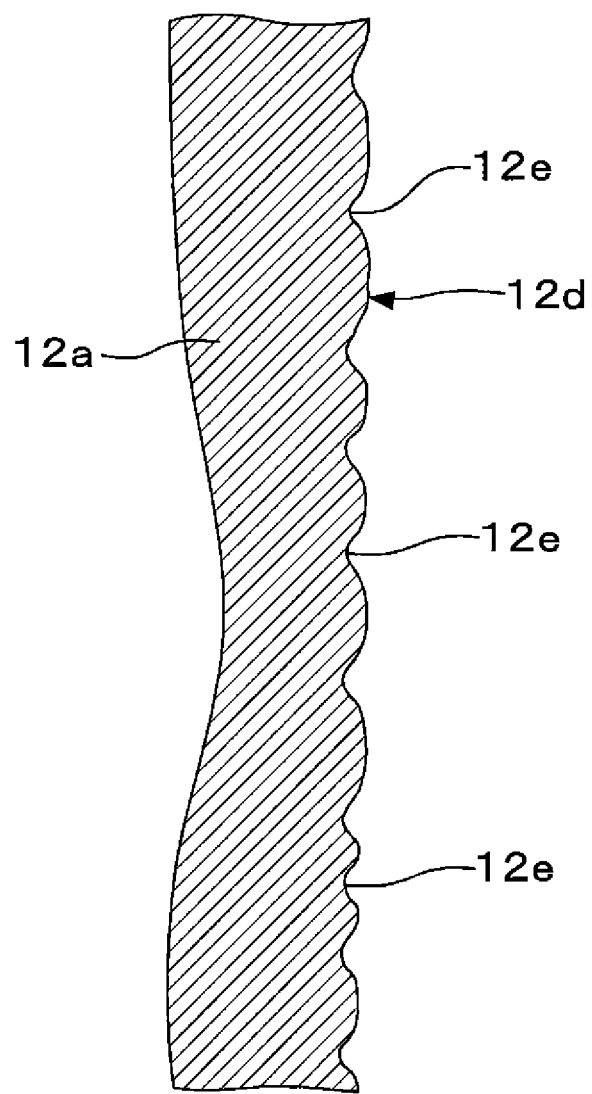
FIG. 10 is a partially enlarged vertical section of a roughened concave wall surface of a deep-recessed grip portion.

After the movable inserts 32 cease to move forward, a blow pressure causes the walls of the deep-recessed grip portions 12, for example, the most-recessed walls 12a, to be pushed onto the roughening mold-surfaces 35. When pressed against the roughening mold surfaces, the walls of the deep-recessed grip portions 12, e.g., surfaces of the most-recessed walls 12a, deform to a state shown by a two-dot chain line in FIG. 13. In this state, tips of the small projections 36 are dug into the walls of the deep-recessed grip portions 12. Thus, roughened concave wall surfaces 12d, such as shown in FIG. 10, are formed on the walls of the deep-recessed grip portions 12.

The features and action-and-effects of this invention have been described with respect to preferred embodiments. However, this invention should not be construed as limitative to these embodiments. For example, the roughened concave wall surfaces 12d may be molded by embossing the concave walls of the deep-recessed grip portions 12 after the bottle container has been blow molded, and not by using the movable inserts 32 to mold the roughened concave wall surfaces 12d. A half portion of the surrounding walls 12A located on the front side may not be treated to have the roughened concave wall surfaces 12d. The roughened concave wall surfaces 12d may be formed only in the most-recessed walls 12a. These and other changes may be made appropriately to the process for and/or the size of the roughened concave wall surfaces 12d.

INDUSTRIAL APPLICABILITY

The bottle container of the pinch-grip type of this invention has a pinch-grip portion obtained by molding deep-recessed grip portions on both right and left side of the body. This bottle can find a wide variety of applications in the field of bottles where easy-to-handle, large-size bottles are exploited.

REFERENCE SIGNS

1. Bottle container
2. Neck
2a. Neck ring
2b. Neck base
3. Shoulder
3p. Panel
3r. Panel Ridge
4. Body
4A. Front wall portion (Portion to be labeled)
5. Side wall portion
6. Rear wall portion
7. Peripheral rib
8. Bottom
11. Recession
12. Deep-recessed grip portion
12A. Surrounding walls
12a. Most recessed wall
12b. Vertical wall
12c. Lateral wall
12d. Roughened concave wall surface
12e. Small dents
13. Reinforcing rib
20. Preform
30. Blow mold
31. Mold surface
32. Movable insert
33. Molding surface of the movable insert
34. Mold groove
35. Roughening mold surface
36. Small projection
G. Grip
TCL. Transverse center line
Wd. Width of the narrowest portion
α. Angle of gradient for the vertical walls
φ. Outer diameter of the neck base
O. Central axis of the bottle container

The invention claimed is:

1. A bottle container of a pinch-grip type, which is a synthetic resin blow-molded product and which comprises: a body of a bottle container, and
a grip comprising:
a pair of right and left deep-recessed grip portions formed by concaving both side wall portions of the body of the bottle container toward each other, and
a rear wall portion of the body disposed at a position rearward from the deep-recessed grip portions in a front-back direction,
wherein each of the deep-recessed grip portions comprises:
a most recessed wall which is deeply caved in,
a pair of vertical side walls disposed on a front side and a back side both as viewed in the front-back direction, in positions facing each other across the most recessed wall, and
lateral walls disposed at upper and lower ends of the most recessed wall, so that a surrounding wall as a whole is formed by these vertical side walls and lateral walls that border the most recessed wall, and
wherein the pair of vertical side walls disposed on the front side and the back side both have an angle of gradient which is set at an approximately right angle relative to a transverse center line extending horizontally in the front-back direction, and passing through a central axis of the bottle container, as seen in a plane cross-section view of the grip portions,
wherein the two most recessed walls face each other across the transverse center line,
wherein a narrowest portion disposed between both of the two most recessed walls of the deep-recessed grip portions has a width more than 0 mm and not greater than an outer diameter of a neck base, as seen in a plane cross-section view of the grip portions, and
wherein the neck base is a portion where a length of its outer diameter is unchanged before and after a preform is biaxially stretched and molded, and disposed at a lower side of a neck portion of the bottle container.

2. The bottle container of the pinch-grip type according to claim 1, wherein the rear wall portion has a semi-circular shape in a plane cross-sectional view of the rear wall portion.

3. The bottle container of the pinch-grip type according to claim 2, wherein each of the most recessed walls has a roughened concave-convex wall surface where there are many small dents.

4. The bottle container of the pinch-grip type according to claim 1, wherein each of the most recessed walls has a roughened concave-convex wall surface where there are many small dents.

5. The bottle container of the pinch-grip type according to claim 4, wherein the roughened concave-convex wall surfaces are formed in all areas of the most recessed walls and all areas of the surrounding wall that border and surrounds each of the most recessed walls.

* * * * *